(12) United States Patent
Deschamps et al.

(10) Patent No.: US 10,038,183 B2
(45) Date of Patent: Jul. 31, 2018

(54) POSITIVE ELECTRODE FOR A LITHIUM BATTERY

(71) Applicants: BLUE SOLUTIONS, Quimper (FR); CENTRE NATIONAL DE LA RECHERCHE SCIENTIFIQUE, Paris (FR)

(72) Inventors: Marc Deschamps, Quimper (FR); Vincent Bodenez, Quimper (FR); Bernard Lestriez, Nantes (FR); Patrick Soudan, Mouzell (FR); Joel Gaubicher, Nantes (FR); Dominique Guyomard, Sautron (FR)

(73) Assignees: BLUE SOLUTIONS, Quimper (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 34 days.

(21) Appl. No.: 14/778,286

(22) PCT Filed: Apr. 23, 2014

(86) PCT No.: PCT/FR2014/050983
§ 371 (c)(1),
(2) Date: Sep. 18, 2015

(87) PCT Pub. No.: WO2014/174212
PCT Pub. Date: Oct. 30, 2014

(65) Prior Publication Data
US 2016/0285078 A1   Sep. 29, 2016

(30) Foreign Application Priority Data
Apr. 24, 2013   (FR) ..................... 13 53754

(51) Int. Cl.
*H01M 4/13* (2010.01)
*H01M 4/136* (2010.01)
(Continued)

(52) U.S. Cl.
CPC ............. *H01M 4/136* (2013.01); *H01M 2/34* (2013.01); *H01M 4/366* (2013.01); *H01M 4/622* (2013.01); *H01M 4/623* (2013.01); *H01M 4/624* (2013.01); *H01M 4/625* (2013.01); *H01M 4/667* (2013.01); *H01M 10/052* (2013.01); *H01M 10/0525* (2013.01); *H01M 10/4235* (2013.01); *H01M 4/5825* (2013.01); *H01M 10/0565* (2013.01); *H01M 2004/028* (2013.01)

(58) Field of Classification Search
None
See application file for complete search history.

(56) References Cited

U.S. PATENT DOCUMENTS 4,948,685 A   8/1990   Ohsawa et al.
6,228,516 B1   5/2001   Denton, III et al.
(Continued)

FOREIGN PATENT DOCUMENTS

CN   102709587   10/2012
CN   103022484   4/2013
(Continued)

OTHER PUBLICATIONS

Search Report dated 2014.

*Primary Examiner* — Scott J Chmielecki
(74) *Attorney, Agent, or Firm* — Ipsilon USA, LLP

(57) ABSTRACT

The present invention concerns a composite positive electrode for a lithium battery, in particular a lithium-metal polymer (LMP) battery, the use of same for producing an LMP battery and an LMP battery comprising same.

14 Claims, 3 Drawing Sheets

(51) Int. Cl.
*H01M 4/36* (2006.01)
*H01M 4/62* (2006.01)
*H01M 10/052* (2010.01)
*H01M 10/0525* (2010.01)
*H01M 2/34* (2006.01)
*H01M 4/66* (2006.01)
*H01M 10/42* (2006.01)
H01M 10/0565 (2010.01)
H01M 4/58 (2010.01)
H01M 4/02 (2006.01)

(56) References Cited

U.S. PATENT DOCUMENTS

| | | | |
|---|---|---|---|
| 6,280,854 B1 | 8/2001 | Tasaka et al. | |
| 8,906,549 B1 * | 12/2014 | Palazzo | H01M 4/131 |
| | | | 429/217 |
| 9,300,007 B1 * | 3/2016 | Dai | H01M 4/131 |
| 2007/0082267 A1 | 4/2007 | Goodenough et al. | |
| 2011/0212364 A1 * | 9/2011 | Chiga | H01M 4/131 |
| | | | 429/217 |
| 2011/0262809 A1 * | 10/2011 | Kumagai | C01G 23/005 |
| | | | 429/211 |
| 2013/0224584 A1 * | 8/2013 | Sung | H01M 4/13 |
| | | | 429/211 |
| 2013/0302677 A1 * | 11/2013 | Lim | H01M 4/505 |
| | | | 429/212 |
| 2014/0030607 A1 * | 1/2014 | Noguchi | H01M 4/0421 |
| | | | 429/322 |

FOREIGN PATENT DOCUMENTS

| | | |
|---|---|---|
| JP | 2002117843 | 4/2002 |
| JP | 2002324542 | 11/2002 |
| JP | 2006120577 | 5/2006 |
| JP | 2009 135010 | 6/2009 |
| JP | 2009135010 A * | 6/2009 |

* cited by examiner

4a

4b

POSITIVE ELECTRODE FOR A LITHIUM BATTERY

RELATED APPLICATIONS

This application is a National Phase Application of PCT/FR2014/050983, filed on Apr. 23, 2014, which in turn claims the benefit of priority from French Patent Application No. 13 53754 filed on Apr. 24, 2013, the entirety of which are incorporated herein by reference.

BACKGROUND

Field of the Invention

The present invention relates to a positive electrode for a lithium battery, in particular a lithium-metal-polymer (LMP) battery, to its use for the production of a lithium battery and to the lithium battery comprising it.

Description of Related Art

It applies to the field of the production of lithium-metal-polymer (LMP) batteries. This type of battery is generally in the form of an assembly of thin films wound (winding of the following pattern {electrolyte/cathode/collector/cathode/electrolyte/anode} over n turns or of n thin films which are stacked (cut and superimposed, i.e. n stacks of the aforementioned pattern). This stacked/complexed unitary pattern has a thickness of the order of one hundred micrometers. 4 functional sheets are involved in its composition: i) a negative electrode (anode) generally consisting of a sheet of metallic lithium or a lithium alloy, ii) an electrolyte composed of a polymer (generally polyoxyethylene (POE) or one of its derivatives) and lithium salts, iii) a positive electrode (cathode) composed of an active electrode material based on metal oxide (such as for example $V_2O_5$, $LiV_3O_8$, $LiCoO_2$, $LiNiO_2$, $LiMn_2O_4$ and $LiNi_{0.5}Mn_{0.5}O_2$, etc.) or based on phosphate of the type $LiMPO_4$ where M represents a metal cation selected from the group Fe, Mn, Co, Ni and Ti, or combinations of these cations, for example $LiFePO_4$, carbon and polymer, and lastly iv) a current collector generally consisting of a sheet of metal and making it possible to provide the electrical connection.

The safety of LMP batteries is an essential criterion with a view to their marketing. When used under poor conditions, such as when overcharged or overdischarged, exothermic parasitic reactions may occur and cause a fire to start in the battery. Various solutions have already been studied and proposed in the prior art in order to combat the problems of overcharging or overdischarging LMP batteries.

Thus, some manufacturers currently add to LMP batteries external electronic systems as a supplement to the battery. An external electronic system makes it possible to deactivate the battery in the event of abnormal behavior. However, the presence of such an external electronic system in an LMP battery leads to an additional cost.

In order to avoid the use of electronic systems external to the battery, electrochemical cells incorporating a layer of a polymer material which becomes nonconductive or semiconductive outside the normal working voltage range of said cells, so as to act as a reversible automatic switch in the event of overcharging or overdischarging of said cells (insulating layer) have already been proposed, particularly in U.S. Pat. No. 6,228,516. The polymer material is used as the only component of the insulating layer, and may be present either in the form of a layer between the positive electrode and the current collector or in the form of a layer coating the particles of active material constituting the composite electrode material. Such a polymer material may in particular be selected from polythiophenes, polypyrroles, polyanilines, and poly(3-(4-fluorophenyl)-thiophenes). Electrochemical systems incorporating such a material, although having improved operational safety, have their electrochemical properties degraded at high potential (>4.0 V).

OBJECTS AND SUMMARY

There is therefore a need for an LMP battery which has improved safety, as well as electrochemical properties at least equivalent to those of a reference LMP battery, that is to say a conventional LMP battery which does not have a system for combating overcharging or overdischarging.

The Inventors set themselves the object of providing a composite electrode material for a lithium-metal-polymer battery which makes it possible to achieve such a result.

The present invention therefore relates to a positive electrode for a lithium battery, and in particular for a lithium-metal-polymer battery, comprising at least one active positive electrode material, at least one binder, at least one agent imparting electronic conduction properties and at least one current collector, said electrode being characterized in that it comprises:

a) an electroactive layer of a composite material comprising:
    at least one polymer P1 selected from polymers which are conductive in the window of working potentials of said battery and insulating at a potential below 1.5 V vs $Li/Li^+$ and/or above 4.8 V vs $Li/Li^+$,
    at least one polymer P2 selected from halogenated polymers, b) a current collector, c) a layer of a composite positive electrode material comprising:
    at least one active positive electrode material,
    at least one agent imparting electronic conduction properties,
    at least one binder, and
    at least one lithium salt;

and in that the electroactive layer is interposed between the current collector and the layer of composite positive electrode material.

Such a positive electrode makes it possible to obtain a lithium battery, in particular an LMP battery, which has improved safety as well as electrochemical properties at least equivalent to those of conventional LMP batteries. Specifically, the electrical conductivity of the electrode is modulated in situ by the presence of the polymer P1 present in the electroactive layer used as an intermediate layer between the current collector and the layer of composite positive electrode material. The polymer P1 present in the electroactive layer will thus act as a switch: highly resistive at low and/or high potential but conductive in the range of activity of the positive electrode, that is to say in the window of working potentials of the LMP battery in which said positive electrode is integrated. This jump in conductivity of the polymer P1 thus makes it possible to greatly limit the phenomena which occur during overcharging and/or overdischarging of the battery, while maintaining conventional use of the battery in its range of potentials.

The polymer P2 makes it possible to improve the homogeneity of the electroactive layer while, by its nature, not interfering with the performance of the battery and of the electroactive layer. Specifically, the Inventors have found that inhomogeneity in the conductive polymer P1 did not allow optimal flow of the current through the electroactive layer, and minimized the performance of the battery. The use of a halogenated polymer (P2) as a binder also allows easier shaping of the electroactive layer and makes it possible to solve this problem.

It will also be noted that the shaping of a conductive polymer into a layer is much simpler than the introduction of this polymer directly into the layer comprising the active electrode material, also mentioned in the prior art, because the conductive polymer then needs to encapsulate all of the active material, which is extremely difficult and may also cause inhomogeneities leading to suboptimal operation of the battery.

By virtue of the addition of the halogenated polymer in the electroactive layer, the conductive polymer does not degrade the performance of the battery during operation even in the form of a layer. It is therefore possible to obtain a battery with good performance, the safety of which when overcharging and/or overdischarging is ensured, and which remains very simple to produce.

Regarding the positive electrode, it will be noted that a single material may fulfill two of the functions indicated above. For example, a single material may be both the active positive electrode material and the agent imparting electronic conduction properties.

The polymer P1 is preferably selected from polymers which are insulating at a potential below 2.8 V and above 3.6 V.

According to one particular and preferred embodiment of the invention, the polymer P1 is selected from polyanilines (conductive between 3.2 and 4.8 V), polythiophenes (conductive between 3.8 and 4.8 V), polypyrroles (conductive between 3.3 and 4.3 V) and poly3,4-ethylenedioxythiophenes (conductive between 1.5 and 2.3 V and between 3.8 and 4.7 V). According to one particularly preferred embodiment of the invention, the polymer P1 is selected from polyanilines.

The halogenated polymer P2 is preferably a fluoropolymer selected from homopolymers and copolymers of vinyl chloride, vinylidene fluoride, vinylidene chloride, tetrafluoroethylene, chlorotrifluoroethylene, copolymers of vinylidene fluoride and hexafluoropropylene, and mixtures of these homopolymers and copolymers. Among these polymers, polyvinylidene fluoride (PVdF) is particularly preferred.

Within the electroactive layer, the polymer P2 preferably represents approximately from 1 to 20% by mass, and even more particularly from 1 to 5% by mass, in relation to the mass of the polymer P1. This is because a lower level would not be sufficient to improve the mechanical strength of the electroactive layer (film), while a higher level would lead to the resistivity of the film increasing. In the latter case, the electroactive layer would become too insulating for the desired application.

According to one preferred embodiment of the invention, the electroactive layer furthermore comprises at least one lithium salt in order to improve the conductivity. The presence of a lithium salt within the electroactive layer is not obligatory because the latter is in contact with the positive electrode layer, which contains lithium ions that diffuse into the electroactive layer. However, the presence of a lithium salt in the electroactive layer does make it possible to further improve the performance of the battery, in particular by improving the compatibility between the polymer P1 and the polymer P2, and therefore the homogeneity of the electroactive layer.

In this case, the lithium salt or salts which may be used in the electroactive layer are preferably selected from the lithium salts conventionally used in lithium batteries, and particularly in LMP batteries and among which the following may be mentioned: $LiBF_4$, $LiPF_6$, lithium bis(trifluoromethylsulfonyl)imide (LiTFSI), lithium bis(fluorosulfonyl)imide (LiFSI), bis(pentafluoroethylsulfonyl)imide (LiBETI), $LiAsF_6$, $LiCF_3SO_3$, $LiSbF_6$, $LiSbCl_6$, $Li_2TiCl_6$, $Li_2SeCl_6$, $Li_2B_{10}Cl_{10}$, $Li_2B_{12}Cl_{12}$, and lithium bis(oxalato) borate (LiBOB).

According to one particularly preferred embodiment of the invention, the lithium salt or salts are selected from LiTFSI, LiFSI, $LiBF_4$, $LiPF_6$ and LiBETI. According to one very particularly preferred embodiment of the invention, the lithium salt is LiTFSI or LiFSI, these making it possible to obtain the best compatibility between the various constituents of the electroactive layer (polymers P1 and P2).

The lithium salt or salts are preferably present in a molar concentration of approximately between 0.1 M (mol/l) and 5 M.

The electroactive layer may be prepared by mixing the various constituents in a solvent, then applying the resulting mixture onto a current collector, for example with the aid of a coating table, then drying in dry air for a period lasting up to 48 hours. The solvent used for the preparation of the electroactive layer preferably belongs to the family of aprotic polar solvents, among which the following may in particular be mentioned: N-methyl-2-pyrrolidone (NMP), dimethyl sulfoxide (DMSO) and dimethylformamide (DMF). Among these solvents, N-methyl-2-pyrrolidone (NMP) is preferred.

According to the invention, the active positive electrode material is preferably a material based on iron phosphate, more preferably $LiFePO_4$ in the form of bare particles or particles comprising a coating containing carbon. In the latter case, the agent imparting electronic conduction properties forms part of the active positive electrode material and it is then not necessary to add an additional agent imparting electronic conduction properties to the mixture of ingredients involved in the composition of the composite material of the positive electrode layer, or else in a lower quantity because of the presence of carbon on the surface of the $LiFePO_4$ particles.

The active positive electrode material preferably represents approximately from 60 to 85% by mass, and even more preferably approximately from 70 to 80% by mass, of the total mass of the ingredients involved in the composition of the composite material of the positive electrode layer in the dry state.

The agent imparting electronic conduction properties may be carbon, selected from among carbon blacks such as acetylene black, carbon blacks with a high specific surface, such as the product marketed under the name Ketjenblack® EC-600JD by the company AKZO NOBEL, carbon nanotubes, graphite, and mixtures of these materials.

According to the invention, the material imparting electronic conduction properties preferably represents approximately from 0.1 to 10% by mass when carbons with a low specific surface are used (by way of indication, specific surface less than 200 $m^2/g$), or approximately between 0.1 and 2.5% by mass when carbons with a high specific surface are used (by way of indication, specific surface more than 1000 $m^2/g$), said percentages being expressed in relation to the total mass of the ingredients involved in the composition of the composite material of the positive electrode layer in the dry state. The percentage of carbon is to be varied as a function of the amount of carbon already possibly contained in the LiFePO$_4$ particles. The use of LiFePO$_4$ particles sufficiently coated with carbon may make it possible to obviate the need of adding a filler containing carbon. Conversely, the use of bare LiFePO$_4$ particles generally makes it necessary to incorporate a conductive material.

The binder which may be used in the composite material of the positive electrode layer according to the invention is preferably in the form of powder, granules or an aqueous dispersion. It is preferably selected from polyethers such as polymers, copolymers and terpolymeres of polyoxyethylene (POE), polyoxypropylene and polyoxybutylene.

This binder preferably represents approximately from 10 to 30% by mass, and even more preferably approximately from 15 to 25% by mass, in relation to the total mass of the ingredients involved in the composition of the composite material of the positive electrode layer in the dry state.

The lithium salt which may be used in the composite material of the positive electrode layer may be selected from the lithium salts mentioned above for the electroactive layer. Among such salts, LiTFSI, LiFSI and LiBETI are preferred.

The amount of lithium salt within the composite material of the positive electrode layer preferably varies approximately from 3 to 10% by mass, and even more preferably approximately from 4 to 8% by mass, in relation to the total mass of the composite material of the positive electrode layer in the dry state.

Just like the electroactive layer, the layer of composite electrode material may be prepared by mixing the various ingredients in a solvent, then applying the resulting mixture onto the electroactive layer previously deposited on a current collector, for example with the aid of a coating table, then drying in dry air for a period lasting up to 48 hours. The solvents which may be used for preparing the composite material of the positive electrode layer are preferably selected from water, alcohols (such as methanol, ethanol or isopropanol) and ketones (such as acetone).

According to one preferred embodiment of the invention, the electroactive layer has a thickness varying approximately from 1 to 15 μm, in the case of a layer of composite positive electrode material whose thickness varies approximately from 20 to 100 μm.

The current collector for the positive electrode generally consists of a sheet of aluminum with a thickness ranging from 4 μm to 30 μm, preferably from 5 to 15 μm, furthermore generally having anticorrosion protection layers on each of the faces in contact with the electroactive layer in order to avoid any chemical reaction on contact with its constituents, in particular with the lithium salt. This anticorrosion protection layer may, for example, consist of an electronically conductive coating which is chemically inert with respect to the components of the electroactive layer, for example a layer of gold, a layer of titanium nitride, a layer of material containing carbon, such as graphite, or a layer of titanium.

The invention also relates to the use of the positive electrode as defined above for the production of a lithium battery, in particular an LMP battery.

Lastly, the invention also relates to a lithium battery comprising at least a positive electrode, a negative electrode, an electrolyte and a current collector for the positive electrode, characterized in that the positive electrode is as defined above.

According to the invention, the negative electrode is preferably a sheet of metallic lithium.

BRIEF DESCRIPTION OF THE DRAWINGS

Besides the arrangements above, the invention also comprises other arrangements which will emerge from the following description that refers to examples of, as well as to the appended figures, in which.

Figure 3:
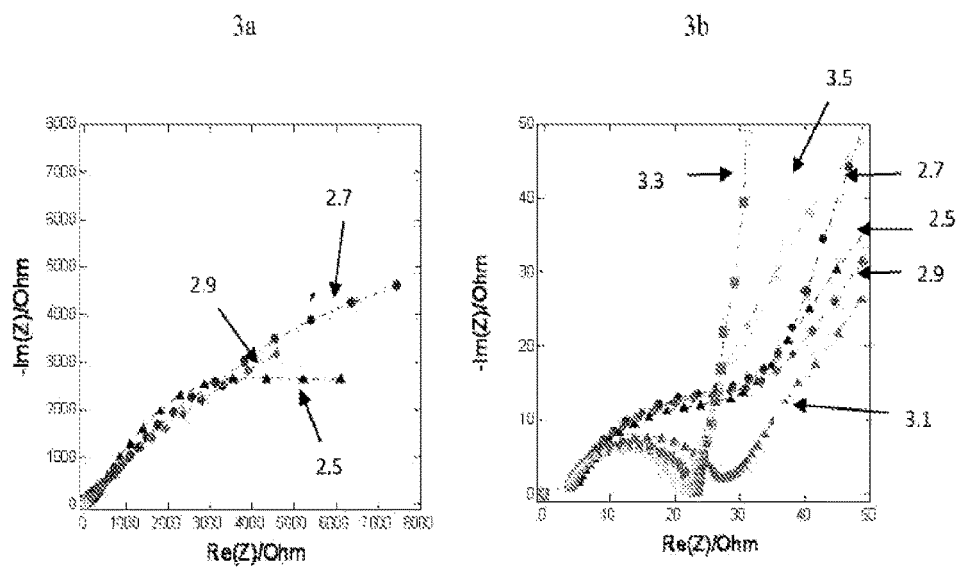
Figure 4:
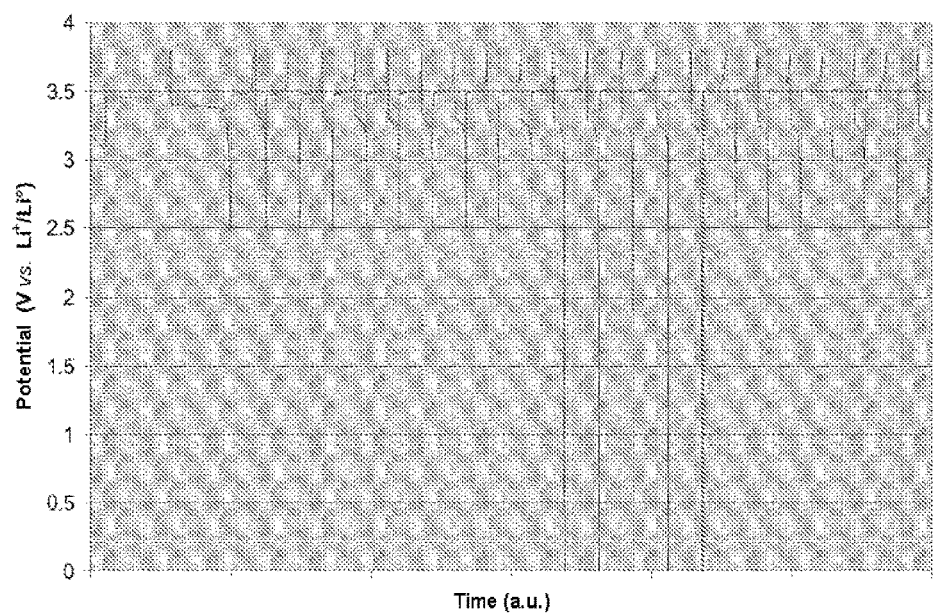
Figure 4:
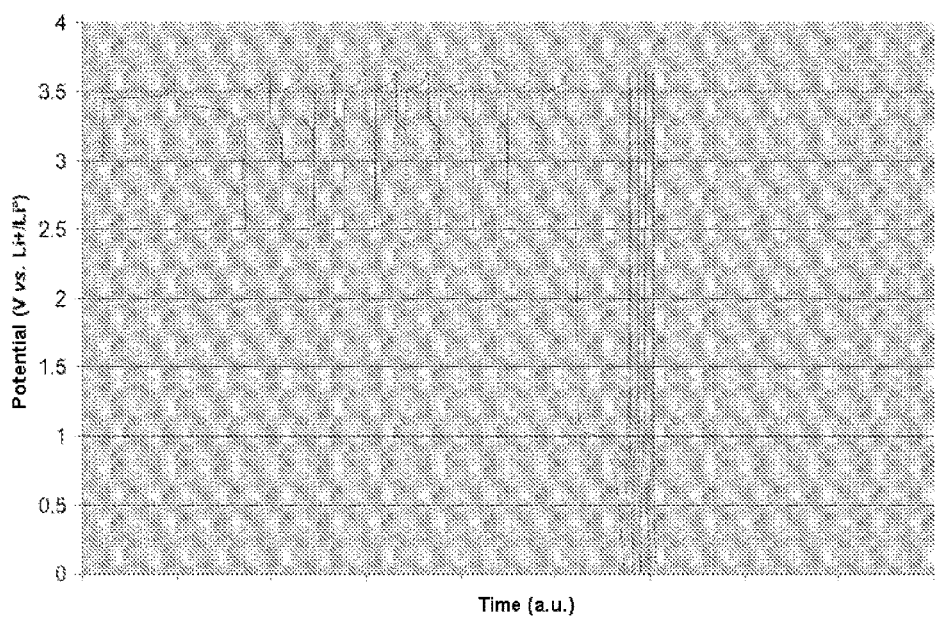

Solid squares: battery according to the invention, the electroactive layer of which comprises a lithium salt in an amount of 0.25 mol/l (battery B1);
Blank triangles: battery according to the invention, the electroactive layer of which comprises a lithium salt in an amount of 0.5 mol/l (battery B2):
Blank circles: battery according to the invention, the electroactive layer of which comprises a lithium salt in an amount of 3 mol/l (battery B3);
Solid rhombi: battery according to the invention, the electroactive layer of which does not comprise a lithium salt (battery B4);
Solid circles: comparative battery, in which the positive electrode was identical in every way to those of batteries B1 to B4, except that it did not contain an electroactive layer (battery BC0)
Blank squares: comparative battery, in which the positive electrode was identical in every way to those of batteries B1 to B4, except that the electroactive layer did not contain polyvinylidene (battery BC1);

FIG. 3 presents the impedance curves in the Nyquist plane which are obtained during the first charging for different open-circuit potentials in the range [2.5 V-3.7 V] vs. Li$^+$/Li$^0$ with a current collector coated with an electroactive layer (0.25 M of LiTFSI) of 10 μm of wet material;

FIG. 4 gives the cycling results of a battery according to the invention (FIG. 4a) in comparison with a battery not having an electroactive layer (FIG. 4b).

DETAILED DESCRIPTION

EXAMPLES

Example 1: Preparation of a Positive Electrode According to the Invention 0.54 g of polyaniline (PAni), 0.054 g of polyvinylidene fluoride (PVdF) and 0.387 g of lithium salt (LiTFSI) were suspended in 157 ml of solvent NMP. This solution was placed under magnetic agitation for four hours then deposited on a current collector consisting of a sheet of aluminum containing carbon, with the aid of a coating table.

This deposit was dried in dry air for 48 hours.

A current collector covered with an electroactive layer consisting of 55% by mass of PAni, 5.5% by mass of PVdF and 39.5% of lithium salt was obtained. This electroactive layer had a thickness of 10 μm and a lithium salt concentration of 0.5 M.

A layer of composite positive electrode material, consisting of 54% by mass of LiFePO$_4$ as active electrode material as well as carbon and a polymer binder, was then applied onto this electroactive layer by rolling.

A positive electrode was thus obtained which can be used for the preparation of an LMP battery, in particular for the preparation of a battery having increased safety in relation to problems connected with overdischarging.

Example 2: Demonstration of the Effects of the Presence of a Lithium Salt within the Electroactive Layer on the Performance of an LMP Battery As explained above, the presence of a lithium salt within the electroactive layer is not obligatory because the lithium salt present within the layer of composite positive electrode material and/or the electrolyte layer can diffuse into the electroactive layer at the time when the battery is assembled and during its operation.

However, as will be demonstrated below, predoping of the electroactive layer with a lithium salt makes it possible to further improve the performance of the battery, in particular its electrochemical properties at high potential (<3.0 V).

A battery according to the invention in an arrangement of the Swagelok® type was prepared with, as the positive electrode, the positive electrode according to the invention as prepared above in Example 1; a molar solution of LiTFSI in a mixture of EC/DMC (1/1, v/v) as the electrolyte and a sheet of metallic lithium as the negative electrode. This battery according to the invention is referred to as battery B2.

Other batteries according to the invention were prepared by modifying the lithium salt concentration in the positive electrode.

These batteries are characterized in that they contain an electroactive layer comprising a polymer P1 (PAni), a polymer P2 (PVdF) and optionally a lithium salt in a variable amount, said electroactive layer being interposed between the current collector of the positive electrode and the layer of composite positive electrode material.

The represented batteries according to the invention had as their respective lithium salt concentration:
  0.25 mol/l of LiTFSI, (denoted B1)
  0.5 mol/l of LiTFSI, (denoted B2)
  3 mol/l of LiTFSI, (denoted B3)
  No lithium salt (denoted B4).

Various comparative batteries (BC) were also prepared according to the same method:
  Comparative Battery BC0: positive electrode identical in every way to those of batteries B1 to B4 according to the invention, except that it did not contain an electroactive layer;
  Comparative Battery BC1: identical in every way to battery B1, except that the electroactive layer did not comprise PVdF.

Each of the batteries was subjected to 5 cycles. In each case, the charging current was equivalent to the insertion of one lithium ion per mole of active material in four hours, and the discharging current was equivalent to the deinsertion of one lithium ion per mole of active material in two hours. The potential range tested was 2-3.65 V against the pair $Li^+/Li^0$.

Figure 1:
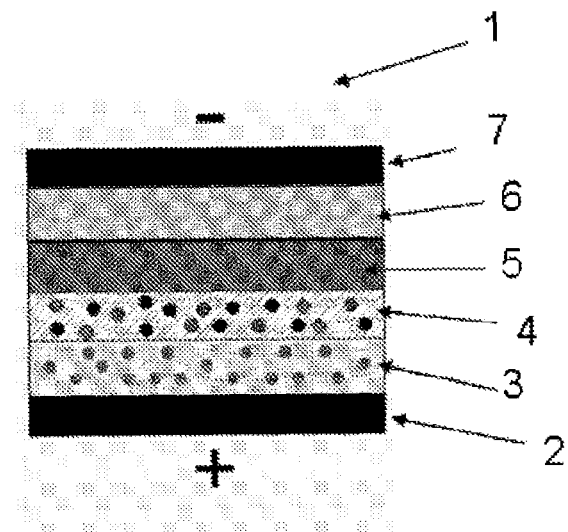
FIG. 1 represents a schematic view in cross section of an LMP battery 1 according to the invention, comprising a current collector 2 on which an electroactive layer 3 rests, the latter being in direct contact with a layer of composite positive electrode material 4 separated from a negative electrode layer 6 and a current collector 7 by an electrolyte layer 5.
Figure 2:
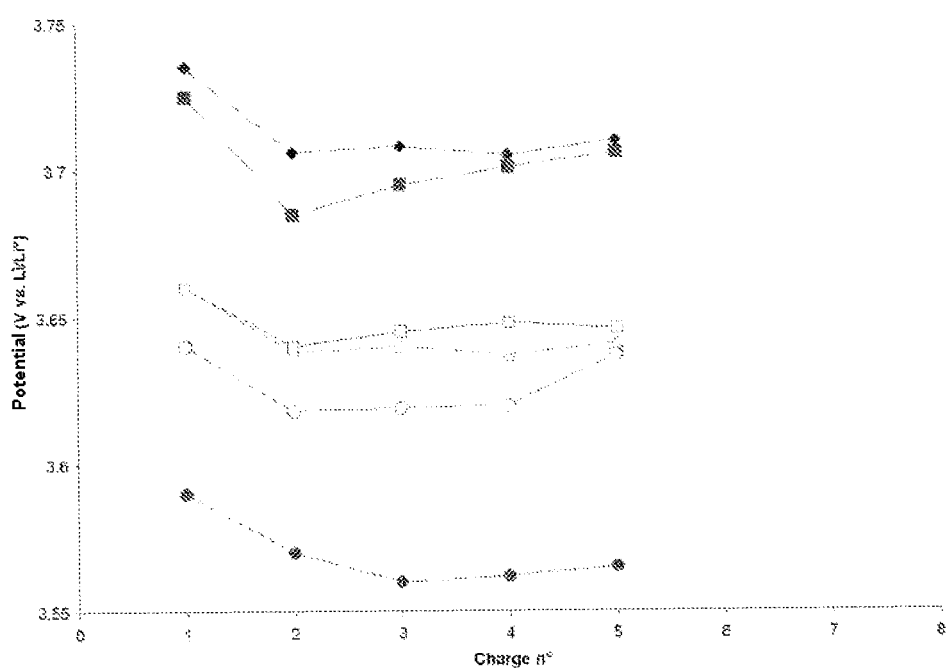
FIG. 2 represents the variation of the oxidation potential (V) of positive electrodes of a plurality of batteries according to the invention in comparison with comparative batteries as a function of the number of charges of the batteries. In this figure, each of the curves corresponds to the different batteries tested.

The variation in the oxidation potential of the positive electrode of each of these batteries, as a function of the lithium salt concentration in the electroactive layer, is reported in appended FIG. 2, in which the potential of the oxidation peak (V) is a function of the number of charges of the battery. In this figure, the legend is as follows:
  battery B1 is represented by solid squares,
  battery B2 is represented by blank triangles,
  battery B3 is represented by blank circles,
  battery B4 is represented by solid rhombi,
  comparative battery BC0 is represented by solid circles,
  comparative battery BC1 is represented by blank squares.

Thus, the results presented in appended FIG. 2 show that it is possible to classify the results obtained into three categories:
  Comparative battery not having an electroactive layer (BC0): an average oxidation potential of approximately 3.56 V is observed. This battery, which does not have a safety device for overcharging or overdischarging, on the other hand presents the "ideal" behavior in terms of the potential of the oxidation peak,
  Battery according to the invention having an electroactive layer not containing a lithium salt (B4) or a low lithium salt concentration (≈0.25 M) (B1): a very high polarization, leading to an offset of about 0.2 V of the oxidation peak, is observed. It will be noted that a low level of PVdF makes it possible to limit the increase of the polarization due to the additional electroactive layer.
  Batteries according to the invention having an electroactive layer containing a lithium salt in an amount greater than or equal to 0.5 M (B2 and B3): the oxidation peak lies at intermediate potentials (0.1 V compared with comparative battery BC0 (without an electroactive layer). This offset is acceptable. It will be noted that, above a lithium salt concentration of 0.5 M, the properties of the electrode in terms of oxidation peak potential are improved slightly but this is not very significant, and in view of the cost of the lithium salt this shows that it is therefore preferable to produce the electroactive layer with a lithium salt concentration of around 0.5 M, in particular between 0.4 and 0.7 M, which makes it possible to obtain an electrode having a more advantageous quality/cost ratio,
  It may also be noted that the battery having an electroactive layer without PvDF (comparative battery BC1) has better properties in terms of oxidation peak potential than when the electroactive layer comprises PvdF. This means that the optimal lithium salt concentration varies increasingly as a function of the PVdF concentration, As already indicated above, these results highlight the importance of the preferred presence of a lithium salt within the electroactive layer in correct operation of the battery: it is preferable to predope the electroactive layer with the aid of a lithium salt in order not to degrade the electrochemical properties at high potential (<3.0 V) of the positive electrode. However, a salt concentration which is too high (B3: lithium salt=3 M), in addition to being expensive, may make the electroactive layer conductive throughout the potential range, which layer would then no longer fulfill its function as an insulating layer at low potential.

In order to interpret this phenomenon, a complex impedance spectroscopy study was carried out on battery B1.

The impedance measurements were carried out on a sample with an active surface area equal to 1 $cm^2$, every 200 mV for potentials of between 2.5 V vs. $Li^+/Li^0$ and 3.7 V vs. $Li^+/Li^0$ during the first charging.

The results obtained are reported in appended FIG. 3 (FIGS. 3a and 3b), in which the impedance (Im(Z)) (expressed in ohms) is a function of the resistance (Re(Z)) (expressed in ohms) for each of the potentials (each of the potentials is indicated respectively beside the curve which it designates).

From this study, it is observed that it is possible to divide the charging of the battery into two separate steps:

for a potential equal to or less than 2.9 V vs. Li$^\pm$/Li$^0$. The resistivity of the system is high (>10 000 Ω/cm$^2$). This result demonstrates the insulating properties of the conductive polymer present in the electroactive layer at low potential.

for a potential greater than 3.0 V vs. Li$^\pm$/Li$^0$. The resistivity of the system is low (≈20 Ω/cm$^2$). This value, which is similar to that which would be obtained (≈25 Ω/cm$^2$) in a battery without an electroactive layer, demonstrates that at high potential the electroactive layer becomes "transparent", that is to say it does not induce an additional resistance to the system.

Example 3: Cycling of a Battery According to the Invention

In this example, cycling of battery B2 according to the invention and as prepared above in Example 2 was carried out.

Battery B2 was cycled in a regime equivalent to the insertion of one lithium in 2 hours during discharging and to the deinsertion of one lithium in 4 hours during charging in the potential range [2.5-3.7] V.

By way of comparison, battery BC0 as prepared above in Example 2, not having an electroactive layer, was cycled under the same conditions.

The corresponding results are presented in appended FIG. 4, in which the curve U (in volts) as a function of time (in arbitrary units) (U=f(t)) corresponding to battery B2 is presented in FIG. 4a and the curve U=f(t) corresponding to battery BC0 is presented in FIG. 4b. In accordance with battery BC0 without an electroactive layer (FIG. 4b), we can describe a cycle in two separate steps:

charging: characterized by a plateau initially present at 3.5 V discharging: characterized by a plateau initially present at 3.35 V It can thus be observed that, in this potential region, the presence of the additional electroactive layer does not modify the properties of the battery (FIG. 4a).

At low potential, the effect of adding an electroactive layer is much more pronounced. While in the case of a conventional battery (battery BC0: FIG. 4b) the first discharge to 0 V (cycle 11) demonstrates the existence of a weakly reversible phenomenon leading to rapid degradation of the electrochemical properties of the system, the curve U=f(t) provided in FIG. 4a and corresponding to battery B2 according to the present invention, that is to say incorporating an electroactive layer, shows a total absence of a plateau at low potential.

This result thus demonstrates the beneficial role at low potential of the electroactive layer in order to combat the problems of overdischarging.

The invention claimed is:

1. An electrode for a lithium battery, and in particular for a lithium-metal-polymer battery, said electrode comprising:
   an electrode that is a positive electrode, having at least one active positive electrode material, at least one binder, at least one agent imparting electronic conduction properties and at least one current collector, wherein said electrode has:
   a) an electroactive layer of a composite material having:
      at least one polymer P1 selected from polymers which are conductive in the window of working potentials of said battery and insulating at a potential below 1.5 V vs Li/Li$^+$ and/or above 4.8 V vs Li/Li$^+$,
      at least one polymer P2 selected from halogenated polymers, and
      at least one lithium salt,
   b) a current collector,
   c) a layer of a composite positive electrode material having:
      at least one active positive electrode material,
      at least one agent imparting electronic conduction properties,
      at least one binder, and
      at least one lithium salt;
   and wherein the electroactive layer is interposed between the current collector and the layer of said composite positive electrode material.

2. The electrode as claimed in claim 1, wherein the polymer P1 is selected from polymers which are insulating at a potential below 2.8 V and above 3.6 V.

3. The electrode as claimed in claim 1, wherein the polymer P1 is selected from polyanilines, polythiophenes, polypyrroles and poly3,4-ethylenedioxythiophenes.

4. The electrode as claimed in claim 1, wherein the halogenated polymer P2 is a fluoropolymer selected from the group consisting of homopolymers and copolymers of vinyl chloride, vinylidene fluoride, vinylidene chloride, tetrafluoroethylene, chlorotrifluoroethylene, copolymers of vinylidene fluoride and hexafluoropropylene, and mixtures of these homopolymers and copolymers.

5. The electrode as claimed in claim 4, wherein the polymer P2 is polyvinylidene fluoride.

6. The electrode as claimed in claim 1, wherein the polymer P2 represents from 1 to 20% by mass in relation to the mass of the polymer P1.

7. The electrode as claimed in claim 1, wherein the lithium salt or salts are selected from the group consisting of LiBF$_4$, LiPF$_6$, lithium bis(trifluoromethylsulfonyl)imide, lithium bis(fluorosulfonyl)imide (LiFSI), bis(pentafluoroethylsulfonyl)imide, LiAsF$_6$, LiCF$_3$SO$_3$, LiSbF$_6$, LiSbCl$_6$, Li$_2$TiCl$_6$, Li$_2$SeCl$_6$, Li$_2$B$_{10}$Cl$_{10}$, Li$_2$B$_{12}$Cl$_{12}$, and lithium bis(oxalato)borate.

8. The electrode as claimed in claim 1, wherein the lithium salt or salts are present in a molar concentration of between 0.1 M and 5 M.

9. The electrode as claimed in claim 1, wherein the active positive electrode material is a material based on iron phosphate.

10. The electrode as claimed in claim 9, wherein the active positive electrode material is LiFePO$_4$ in the form of bare particles or particles having a coating containing carbon.

11. The electrode as claimed in claim 1, wherein the agent imparting electronic conduction properties is carbon, selected from the group consisting of carbon blacks, carbon nanotubes, graphite, and mixtures of these materials.

12. The electrode as claimed in claim 1, wherein the electroactive layer has a thickness varying from 1 to 15 μm, in the case of a layer of composite positive electrode material whose thickness varies from 20 to 100 μm.

13. A lithium battery comprising;
   at least a positive electrode,
   a negative electrode,
   an electrolyte and a current collector for the positive electrode,
   wherein the positive electrode is as defined in claim 1.

14. A lithium battery according to claim 13, wherein the lithium battery is a lithium metal polymer battery.

* * * * *